United States Patent
Penner et al.

(10) Patent No.: US 7,992,078 B2
(45) Date of Patent: Aug. 2, 2011

(54) APPARATUS AND METHOD FOR CREATING PUBLICATIONS FROM STATIC AND DYNAMIC CONTENT

(75) Inventors: Terry Wayne Penner, Burnaby (CA); Francis Wai Gee Lui, Vancouver (CA); Wai Sing Wang, Richmond (CA); Michael Akio Tsumura, Richmond (CA); David MacLean, Vancouver (CA)

(73) Assignee: Business Objects Software Ltd, Dublin (IE)

( * ) Notice: Subject to any disclaimer, the term of this patent is extended or adjusted under 35 U.S.C. 154(b) by 996 days.

(21) Appl. No.: 11/777,957

(22) Filed: Jul. 13, 2007

(65) Prior Publication Data

US 2008/0256429 A1    Oct. 16, 2008

Related U.S. Application Data

(63) Continuation-in-part of application No. 11/680,547, filed on Feb. 28, 2007.

(51) Int. Cl.
   *G06F 17/00* (2006.01)
(52) U.S. Cl. ...................................................... 715/200
(58) Field of Classification Search .................. 715/255, 715/200
   See application file for complete search history.

(56) References Cited

U.S. PATENT DOCUMENTS

| | | | | |
|---|---|---|---|---|
| 7,380,201 B2* | 5/2008 | Vasey | ............................ | 715/200 |
| 7,526,898 B2* | 5/2009 | Miller | ............................ | 52/234 |
| 2002/0073121 A1* | 6/2002 | Sano et al. | .................... | 707/517 |
| 2002/0091609 A1 | 7/2002 | Markowski | | |
| 2002/0107889 A1 | 8/2002 | Stone et al. | | |
| 2002/0194131 A1* | 12/2002 | Dick | .............. | 705/51 |
| 2003/0041303 A1* | 2/2003 | Milton | .......................... | 715/513 |
| 2003/0080999 A1* | 5/2003 | Stone et al. | .................... | 345/751 |
| 2003/0126275 A1 | 7/2003 | Mungavan et al. | | |
| 2003/0229543 A1* | 12/2003 | Zimmerman et al. | .......... | 705/26 |
| 2004/0049445 A1* | 3/2004 | Kishore | .......................... | 705/37 |
| 2004/0130751 A1 | 7/2004 | Hirtenreiter et al. | | |
| 2004/0133542 A1* | 7/2004 | Doerksen et al. | ................. | 707/1 |
| 2004/0205656 A1* | 10/2004 | Reulein et al. | ................. | 715/530 |
| 2004/0230508 A1* | 11/2004 | Minnis et al. | .................... | 705/35 |
| 2005/0050442 A1* | 3/2005 | Pope et al. | ..................... | 715/500 |
| 2005/0120298 A1* | 6/2005 | Petrujkic | ........................ | 715/511 |
| 2005/0125728 A1* | 6/2005 | Peiro et al. | ..................... | 715/523 |
| 2005/0166142 A1* | 7/2005 | Mise et al. | ..................... | 715/517 |
| 2005/0185212 A1 | 8/2005 | Gauthier | | |
| 2005/0210376 A1* | 9/2005 | Zirngibl et al. | ............... | 715/513 |
| 2005/0278533 A1* | 12/2005 | Mayer | ........................... | 713/170 |

(Continued)

OTHER PUBLICATIONS

Wilbur et al., The GovStat Content Delivery Template (CDT) for Creating Explanatory Animations, ACM 2004 , pp. 1-2.*

(Continued)

*Primary Examiner* — Cong-Lac Huynh
(74) *Attorney, Agent, or Firm* — Mintz, Levin, Cohn, Ferris, Glovsky and Popeo, P.C.

(57) ABSTRACT

A computer readable storage medium comprises a publication definition module to create and define properties for a publication object. The publication definition module includes executable instructions to associate a set of static documents and a set of report templates with the publication object. Executable instructions define a conditional delivery rule for the publication object. The conditional delivery rule specifies a condition for the inclusion of a report template from the set of report templates to be merged with a static document from the set of static documents.

19 Claims, 10 Drawing Sheets

U.S. PATENT DOCUMENTS

| | | | |
|---|---|---|---|
| 2005/0289461 A1* | 12/2005 | Amado et al. | 715/530 |
| 2006/0031746 A1* | 2/2006 | Toepfer et al. | 715/500 |
| 2006/0031762 A1* | 2/2006 | Takashima | 715/517 |
| 2006/0041443 A1 | 2/2006 | Horvath | |
| 2006/0048096 A1 | 3/2006 | Jiang et al. | |
| 2006/0129924 A1* | 6/2006 | Nelson et al. | 715/530 |
| 2006/0136307 A1* | 6/2006 | Hays et al. | 705/26 |
| 2006/0179320 A1* | 8/2006 | Berringer et al. | 713/180 |
| 2006/0242555 A1* | 10/2006 | Lapstun et al. | 715/501.1 |
| 2007/0016785 A1* | 1/2007 | Guay et al. | 713/176 |
| 2007/0083429 A1* | 4/2007 | Kraft | 705/14 |
| 2007/0089053 A1 | 4/2007 | Uhlig et al. | |
| 2007/0156590 A1* | 7/2007 | Yoon et al. | 705/51 |
| 2007/0214218 A1* | 9/2007 | Ward et al. | 709/205 |
| 2007/0276754 A1* | 11/2007 | Parmelee et al. | 705/43 |
| 2007/0277042 A1* | 11/2007 | Dietl | 713/176 |
| 2008/0028300 A1* | 1/2008 | Krieger et al. | 715/255 |
| 2008/0059494 A1* | 3/2008 | Schuessler et al. | 707/100 |
| 2009/0076954 A1* | 3/2009 | Carmody et al. | 705/40 |
| 2009/0119133 A1* | 5/2009 | Yeransian et al. | 705/4 |

OTHER PUBLICATIONS

Tufte et al., Merge as a Lattice—Join of XML Documents, Google 2002, pp. 1-13.*

Norrie et al., Content Publishing Framework for Interactive Paper Documents, ACM 2005, pp. 1-10.*

Brown et al., Context-aware Retrieval: Exploring a New Environment for Information Retrieval and Information Filtering, Google 2001, pp. 253-263.*

Marx et al, CLUES: Dynamic Personalized Message Filtering, ACM 1996, pp. 113-121.*

PCT/US08/7003 ISR, Oct. 6, 2008.

International Search Report and Written Opinion for International Application No. PCT/US2008/052160, mailed on May 1, 2008, 7 pages.

* cited by examiner

APPARATUS AND METHOD FOR CREATING PUBLICATIONS FROM STATIC AND DYNAMIC CONTENT

CROSS-REFERENCE TO RELATED APPLICATION

This application is a continuation-in-part of U.S. patent application Ser. No. 11/680,547, filed Feb. 28, 2007, entitled "Apparatus and Method for Defining and Processing Publication Objects", the contents of which are incorporated herein by reference.

BRIEF DESCRIPTION OF THE INVENTION

This invention relates generally to data retrieval and processing. More particularly this invention relates to combining static and dynamic content into an electronic publication.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics data warehousing systems to cleanse and consolidate information from disparate sources, integration tools to analyze and generate workflows based on enterprise systems and tools that work with database management systems ("DBMS") to organize, store, retrieve and manage data in databases, such as relational. Online Transaction Processing ("OLTP") and Online Analytic Processing ("OLAP") databases.

In many organizations data is stored in multiple data sources that are not readily compatible. Data sources may be as diverse as relational, OLTP and OLAP databases spreadsheets XMI files, text files, and groupware files, among, others. Each type of data source may be used for different purposes with, in general, OLTP databases used to store transaction-oriented data, relational databases used to store and organize data according to data relations, OLAP databases used to store data requiring analytical processing, and spreadsheets, XMI, files, text files, and groupware files used to store data for a variety of applications and needs.

For example, organizational data for a financial institution may be distributed among an OLAP database for storing real-time financial transactions, a relational database for storing data pertaining to customers, an OLAP database for storing financial history data according to stock, geographical regions, and time period, and various spreadsheets storing performance figures for each member of the financial team. Retrieving data for analysis may therefore require multiple queries to multiple data sources.

There are a number of commercially available tools that can retrieve data from multiple data sources automatically. These tools can also integrate the data into a single "report" to facilitate analysis of the retrieved data. For example, Business Objects™ of San Jose Calif., sells a number of widely used report generation tools, including Crystal Reports™ Business Objects Voyager™, Business Objects Web Intelligence™, and Business Objects Enterprise™. The data is typically retrieved in response to computer executable instructions and processed in accordance with a report schema. The report schema specifies the form in which the data is presented in the report.

As such, a report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata). Unlike other non-report documents that are constructed without the automatic retrieval of data from a data source but may optionally import external data within a document, e.g., word processor and presentation documents, a report by design is primarily a medium for accessing, formatting transforming, and/or presenting external data.

Data in a report may be formatted in a variety of structures, including, but not limited to, table structures, sections, cross-tables, synchronized tables, sub-reports, hybrid charts, and the like. A report can interpret the data therein and perform calculations based on the original (or a redefined) data structure and meaning of the imported data as well as on pre-existing relationships between elements of imported data. The report generation tools may support a range of calculation models.

Report generation tools may also include tools for processing and distributing reports. For example. Business Objects Enterprise™ from Business Objects™. San Jose, Calif. includes features for scheduling multiple reports simultaneously so that they are processed and delivered together to a specified recipient. The processing of reports can include the merging of dynamic documents, i.e., documents containing information that is updated on a periodic or frequent basis, with static documents, such as PDF documents, word processor documents, and the like. This process can be complicated by the need to provide each user with their own report with suitable data intended specifically for that user.

Using the financial institution example above, consider a financial advisor trying to inform clients of their holdings. The financial advisor periodically sends each one of its clients a letter with financial advice, boilerplate information such as disclaimers of the type "past performance is not an indicator of future returns," and a detailed summary of their holdings. Now suppose the financial advisor would like to customize the detailed summary of each client's holdings to only include information for those client's stocks that outperformed a given metric. This would require the reporting generation tool to customize the delivery of data in the report for each user.

Currently-available report generation tools have limited merging capabilities. While they are able to merge static and dynamic objects into a single report, there is no report generation tool available today that offers users the capability to condition the delivery of data in the report for each user. That is, there is no report generation tool available today that offers users the capability to select portions of the data and other dynamic content in the report for each user. There also is no report generation tool that provides users a delivery rule framework for conditioning the merging of static and dynamic documents into a single formatted publication document. As a result, managing the reporting needs of a business enterprise that deals with large amounts of data spread across multiple data sources to be distributed to multiple users can be very time consuming. Users may be required to manually go through various interfaces or each individual report before selecting portions of the dynamic content in the reports for publication.

Accordingly, it would be desirable to provide techniques to address the shortcomings of existing report generation tools.

SUMMARY OF THE INVENTION

The invention includes a computer readable storage medium with a publication definition module to create and define properties for a publication object. The publication definition module includes executable instructions to associate a set of static documents and a set of report templates with the publication object. Executable instructions define a conditional delivery rule for the publication object. The conditional delivery rule specifies a condition for the inclusion of a report template from the set of report templates to be merged with a static document from the set of static documents.

BRIEF DESCRIPTION OF THE DRAWINGS

The invention is more fully appreciated in connection with the following detailed description taken in conjunction with the accompanying drawings in which like reference characters refer to like parts throughout, and in which.

DETAILED DESCRIPTION OF THE INVENTION

The present invention provides a system, method, software arrangement, and computer readable storage medium for creating publication documents from both dynamic and static documents. As generally used herein a publication document may be a merged document including at least a portion of a dynamic document and a portion of a static document. A dynamic document may be any document containing information that is automatically updated on a periodic or frequent basis, such as, for example, a report. Conversely, a static document may be any document containing information that is not automatically updated within the document, such as word processor documents, PDF documents, and the like.

According to the present invention, the publication document may be created as a result of processing of a publication object. A publication object may be associated with multiple dynamic documents and multiple static documents. In one exemplary embodiment, the dynamic documents associated with the publication object may be report templates. A report template, as generally used herein, may be a report where the content does not include external data, either saved within the report or accessed live.

In one exemplary embodiment, a conditional delivery rule may be defined for the publication object to specify a condition for the inclusion of one or more report templates to be merged with a static document or static document part and form a publication document. The conditional delivery rule may include one or more logical conditions defined in the report templates. The logical condition may be, for example, a formula that determines whether to deliver the report template to a given recipient. The logical condition may also be user-defined, for example a condition that specifies delivery of a report template to a given recipient only during given time periods or depend on an attribute of the recipient.

For example, consider a sales department trying to determine sales bonuses to the sales force at the end of a given quarter. A formula may be defined in a report template that specifies delivery of the report template only if "sales>$100,000." If the formula evaluates to true, that report template may be associated with a publication object and merged with other static documents into a publication document destined to a member of the sales force. The publication document may be, for example, a letter from a sales department manager to the member of the sales force detailing the bonus for that quarter.

In accordance with the present invention, the publication object may be processed into a publication document for delivery to a recipient. When processing the publication object, one or more report templates may be selected and processed to fetch data from one or more data sources and return data results for the selected report templates. The data sources may include databases, such as relational, transactional, hierarchical, multidimensional, object oriented, and the like. Further, data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, and any other data source accessible through an established protocol, such as Open DataBase Connectivity ("ODBC") and the like.

In one exemplary embodiment, the publication object may be processed according to a processing schedule. The publication object may also be processed for multiple recipients to generate multiple publication documents. In this case, each recipient may receive a distinct publication document depending on their unique data and how the conditional delivery rule evaluates that unique data.

Advantageously, the present invention allows users to seamlessly create publication documents that are personalized for each recipient and include both dynamic and static documents. The present invention also allows users to personalize document publications by applying a delivery rule framework within easy-to-use document management interfaces.

Figure 1:
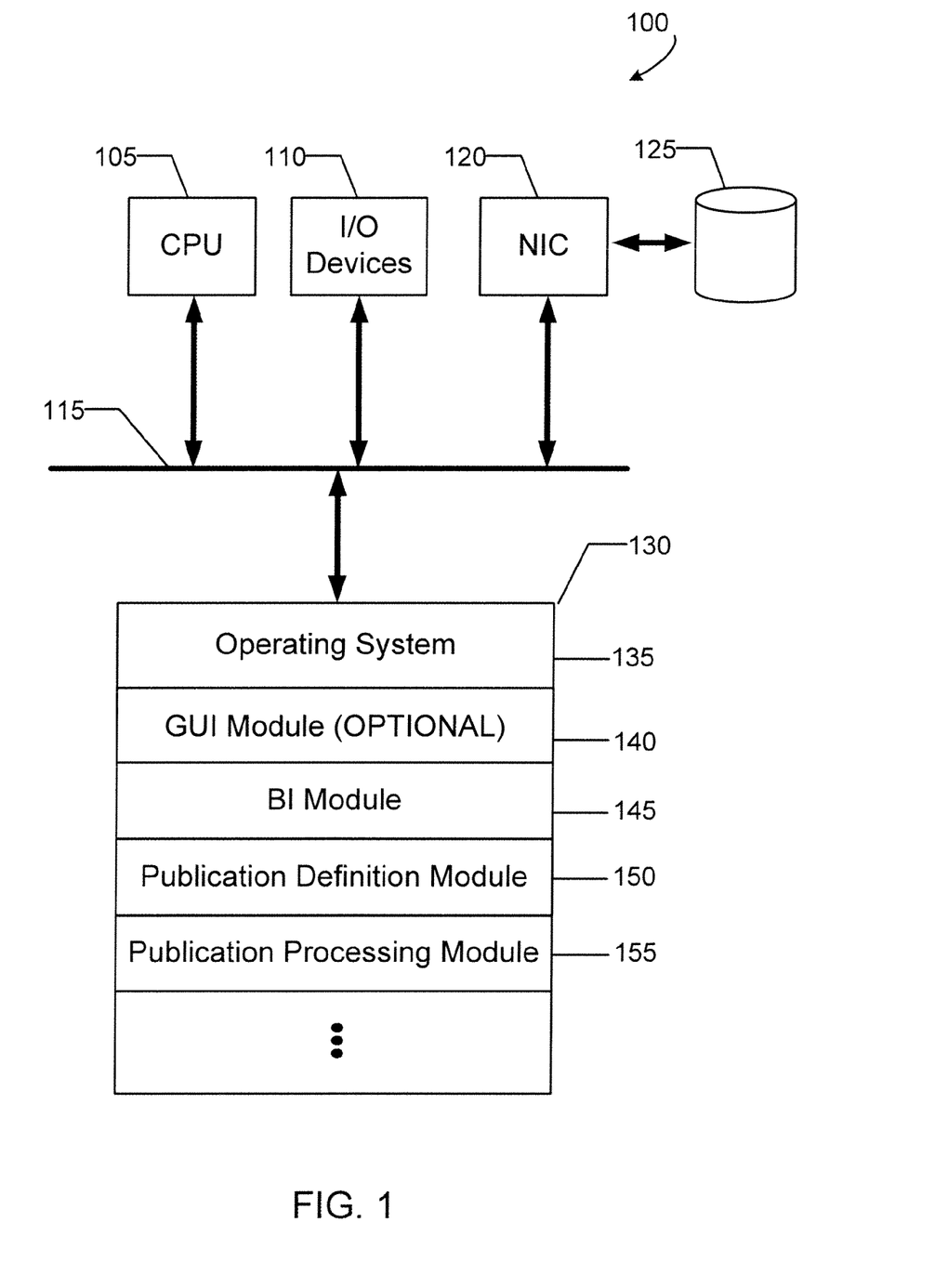
FIG. 1 illustrates a computer constructed in accordance with an embodiment of the invention.

Referring now to FIG. 1, a computer configured in accordance with an embodiment of the invention for implementing software instructions for creating publication documents from static and dynamic documents is provided. Computer 100 includes standard components, including a Central Processing Unit ("CPU") 105 and input/output devices 110, which are linked by a bus 115. Input output devices 110 may include a keyboard, mouse, touch screen, monitor, printer, and the like.

Network Interface Circuit ("NIC") 120 may also be connected to the bus 115. NIC 120 provides connectivity to a network (not shown), thereby allowing computer 100 to operate in a networked environment. For example, networked data sources 125 are connected to computer 100 through NIC 120. In accordance with the present invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: an operating system module 135, an optional Graphical User Interface ("GUI") module 140, a Business Intelligence ("BI") module 145, a Publication Definition module 150, and a Publication Processing module 155.

Operating system module 135 may include instructions for handling various system services such as file services or for performing hardware dependant tasks. The optional GUI module 140 may rely upon standard techniques to produce graphical components of a user interface, such as, windows, icons, buttons, menu and the like, examples of which are discussed below.

BI module 145 includes executable instructions to perform BI-related functions, such as, performing abstract queries and analyses, producing reports, accessing data sources such as relational and/or multidimensional databases, accessing document storage repositories, and the like.

In accordance with the present invention. Publication Definition module 150 includes executable instructions for creating and defining properties for a publication object, including accessing multiple static and dynamic documents such as report templates. Publication Processing module 155 includes executable instructions for processing publication objects such as, for example, fetching data, generating reports, evaluating delivery rules and format and destination settings, and generating publication documents, among others.

Publication Processing module 155 also includes executable instructions to generate reports and publication documents according, to multiple formats and delivery settings, and to deliver reports and publication documents to multiple recipients, as described in the co-pending, commonly-owned U.S. patent application Ser. No. 11/680,547, entitled "Apparatus and Method for Defining and Processing Publication Objects." which is incorporated herein by reference.

It should be appreciated that the executable modules stored in memory 130 are exemplary. It should also be appreciated that the functions of the modules may be combined. In addition, the functions of the modules need not be performed on a single machine. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

Figure 2:
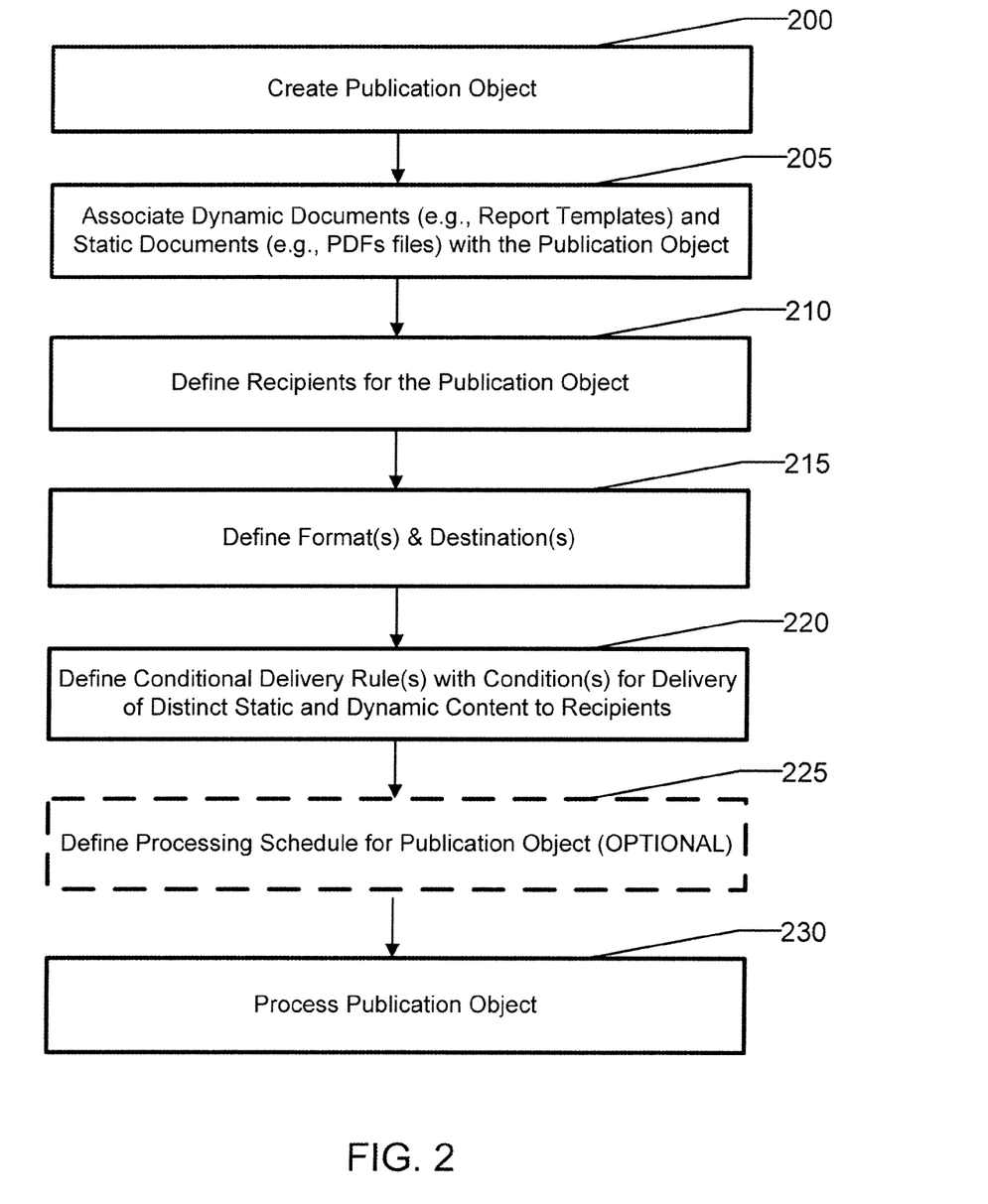
FIG. 2 illustrates a flow chart for creating and defining a publication object in accordance with an embodiment of the invention.

Referring now to FIG. 2, a flow chart for creating and defining a publication object in accordance with an embodiment of the invention is described. The operations of FIG. 2 may be implemented using Publication Definition module 150 either independently or in conjunction with GUI module 140. Initially, a new and empty publication object is created (200). The publication object typically includes instructions for specifying a name for the new publication object and a location for the publication object to be stored. In one exemplary embodiment, additional information such as a description and a category for the publication object may also be specified.

The publication object may be associated with both dynamic and static documents (205). In one exemplary embodiment, the dynamic documents may be report templates. A user may associate multiple report templates with the publication object in order to provide centralized control by the publication object of processing and delivery of multiple publication documents. In one exemplary embodiment, report templates of different types may be associated with a publication object, such as Crystal Reports™, WebIntelligence™ and Business Objects Voyager™ report templates.

A user may specify multiple recipients for the publication documents generated by the publication object (210). Recipients defined for the publication object may be characterized by recipient metadata information with at least an identification of the recipient, such as a name or ID number and a delivery destination for the recipient, such as an e-mail address or a folder on a computer system.

In an exemplary embodiment of the invention, recipients can include predefined enterprise recipients and dynamically defined recipients. Predefined enterprise recipients, such as for a corporate computer system or the like, typically include recipient metadata profiles that include additional attributes for a recipient, such as security or permissions settings for the recipient, functional or other groups to which the recipient belongs, additional report delivery destinations for the recipient, and the like. Dynamically defined recipients are typically defined by reference to another source or list of recipient information, such as a mailing list or contact database for example, or may be defined individually by a user.

Next, formats and destinations are defined with the publication object (215). This allows a user to specify one or more generation formats and delivery destinations for publication documents generated from each report template associated with the publication object. In one exemplary embodiment, multiple formats and/or destinations can be defined for publication documents generated from a report template associated with a publication object. In an embodiment, a default format and destination is defined.

Suitable formats for the generation of reports that can be defined for a publication object include: Crystal Report .rpt, Adobe Acrobat .pdf, Microsoft Word .rtf rich text format .rtf, Microsoft Word editable .rtf, Microsoft Excel .xls, Multipurpose Internet Mail Extension HTML .mhtml, text .txt, tab separated text .ttx, separated values .csv, XML, and compressed archive file formats. Suitable destinations for delivery of reports that can be defined for a publication object may include e-mail, ftp, business intelligence dashboard, inbox, system folder and repository, and custom destinations, among others.

In an exemplary embodiment of the invention, defining a format and a destination for a publication objects includes defining a format and destination for each report template. This includes selecting one or more portions of a particular defined report format to be delivered to the defined destination in a common merged or consolidated publication document.

A conditional delivery rule(s) with a condition(s) for delivery of distinct dynamic and static content to recipients may then be defined and associated with the publication object (220). The conditional delivery rule allows a user to specify one or more conditional delivery rules to determine if a report template is to be merged with a static document or static document part and form a publication document. The conditional delivery rule may include one or more logical conditions defined in the report templates. The logical condition may be for example, a formula that determines whether to deliver the report template to a given recipient. The logical condition may also be user-defined, for example, a condition that specifies delivery of a report template to a given recipient only during given time periods, or depend on an attribute of the recipient.

In one example, a delivery rule may include a logical condition specifying that a distinct publication document will be delivered to a recipient if the recipient's name is equal to a particular value, or if the recipient belongs to a specific group. In another example, a delivery rule may include a logical condition that a distinct publication document will be delivered to a recipient if the recipient has a specific security or permission setting.

A delivery rule logical condition for a distinct report may be defined in the report template for that report. In such a case, the logical condition can be defined relative to a variable or parameter defined in the report template. In an exemplary embodiment of the invention, an alert function may be used to implement a conditional delivery rule so that a distinct publication document is delivered to one or more defined recipients if a condition defined for the alert, such as a logical condition, is triggered. In addition to determining if a distinct publication document is delivered to one or more defined recipients, a logical condition may also determine whether a report will be generated from a report template upon processing the publication object.

In an exemplary embodiment of the invention, defining a conditional delivery rule with a condition for delivery includes defining an empty delivery rule. An empty delivery rule is where a user can choose not to deliver the publication document to a recipient if there is no data in the document. In an embodiment, the user does not have to create an alert to trigger the rule. The user may check a box. In this way, a user does not have to write a formula. In an embodiment, defining a conditional delivery rule with a condition for delivery includes defining a global delivery rule for one or more publication objects used in a publication run. With the global delivery rule, as with all rules, a recipient can take the form of an individual or a group of individuals.

Optionally, a processing schedule may be defined for the publication object (225). The processing schedule allows a user to specify a schedule to determine when, or under what circumstances, the publication object is to be processed. In one exemplary embodiment, the publication object can be scheduled for processing according to a regular time interval, such as daily or weekly or in response to a trigger defined in the schedule, such as the opening of a document, the trigger of an alert, or the satisfaction of a logical condition defined in the schedule.

In an embodiment, the user may elect prior to or instead of scheduling the publication object to dispatch the publication object for processing in a test environment (not shown). The conditional delivery rules can be tested prior to processing the publication object in a production system.

The publication object may then be processed to generate one or more publication documents and deliver them to defined recipients (230). In an optional embodiment of the invention, a personalization filter may be defined for the publication object to personalize the generation of one or more publication documents associated with the publication object relative to one or more recipients. The personalization filter may typically specify one or more recipient attributes, such as recipient name, group or security setting as values for one or more parameters defined in a report template. Upon processing the publication object, the one or more recipient attributes are used to evaluate the one or more parameters in the report template, such that the resulting publication document is generated according to the personalized parameter values for each recipient.

Figure 3:
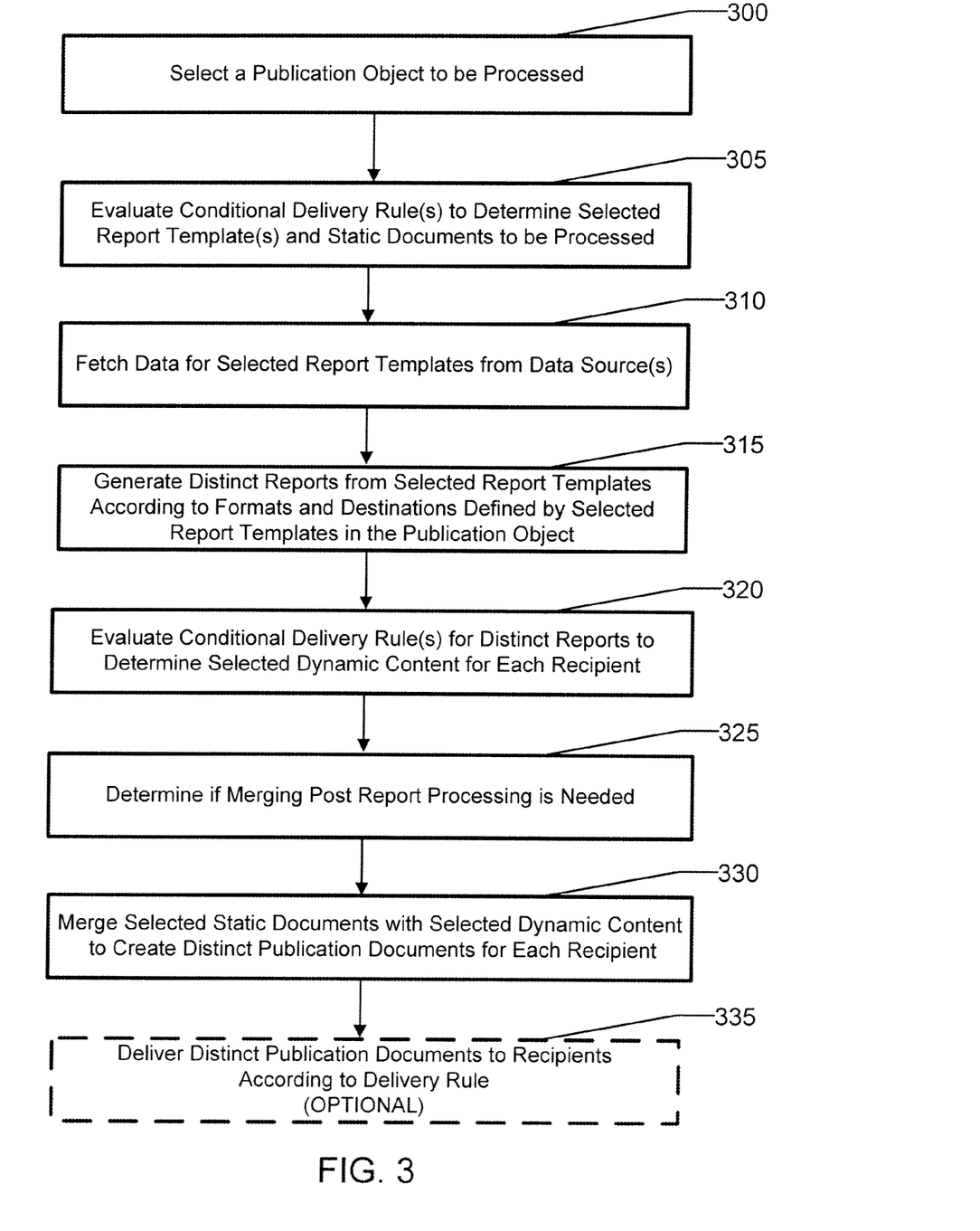
FIG. 3 illustrates a flow chart for processing the publication object created and defined as in FIG. 2 in accordance with an embodiment of the invention.

Referring now to FIG. 3, a flow chart for processing the publication object created and defined as in FIG. 2 in accordance with an embodiment of the invention is described. The operations of FIG. 3 may be implemented using Publication Processing module 155, optionally in conjunction with BI module 145. First, the conditional delivery rule(s) may be evaluated to determine one or more report templates and one or more static documents to be processed (300). In an alternative embodiment, the evaluation of the one or more conditional delivery rules specifies which report templates and static documents will not be processed and any remaining report templates and static documents are selected for processing.

Second, the conditional delivery rule(s) are evaluated to determine one or more report templates and one or more static documents to be processed (305). In an alternative embodiment, the evaluation of the one or more conditional delivery rules specifies which report templates and static documents will not be processed and any remaining report templates and static documents are selected for processing.

Third, data for the selected report templates may be fetched from one or more data sources by defining and executing queries against the data sources to return data results for the selected report templates (310). The definition and execution of queries may be implemented by any suitable known reporting query engine or system, such as a query engine using a semantic layer or other abstraction layer to formulate queries for execution against one or more data sources, such as networked data source 125. Accordingly, publication processing module 155 may include instructions to implement such a suitable query engine.

Next, the data is associated with the report templates to create distinct reports that may be generated from selected report templates according to formats and destinations defined by the selected report templates (315). This produces distinct reports for each of the selected report templates using the data fetched from the one or more data sources in 310. The generation of distinct reports may be implemented using any suitable known reporting engine or system. As such, Publication Processing module 155 may include instructions to implement such a suitable reporting engine.

After the reports are generated in processing operation 315, the conditional delivery rule(s) may be evaluated for the distinct reports to determine selected dynamic content from the reports for each recipient (320). As described above, this may involve evaluating one or more logical conditions defined in the report templates. For example, a formula may be evaluated to determine which data from the report to include in a publication document for the recipient. In an embodiment, the logical condition of the delivery rule is evaluated in the data context of each recipient. For example, the condition may be defined as sales greater than $1000. The value taken for the sales variable during the condition evaluation is the corresponding data value of the distinct report targeting the recipient in question.

After the conditional delivery rules have been applied in 320, the publication processing module 155 determines if post report creation processing is required for each recipient defined in the publication object and for each destination for each recipient (325). In one scenario, the publication processing module 155 determines if the dynamic document(s) need to be merged with any static documents on a per destination basis. In another scenario, a determination is based upon alternative forms of post processing. Other forms of post processing may include: digitally signing or encrypting a publication document, aggregating and optionally compressing a collection of publications, or executing a plugin with computer executable instructions. An example of the last case is a user writing a plugin that sends notifications. The execution of the plugins is ordered so that subsequent plugins can use the output from previously executed plugins. For example, a merged publication containing static and dynamic documents can be digitally signed, then encrypted, and then distributed via email or a sub-set of these operations.

The selected dynamic content (if any) is then merged with static documents or static document parts associated with the publication object to create a distinct publication document for each recipient (330). In an embodiment of the invention where one or more portions of distinct reports have been selected for inclusion in a publication document, the publication document is created including all such selected portions of reports according to the formats defined in the corresponding report templates.

The distinct publication documents may be optionally delivered to the recipients according to one or more conditions set forth in the conditional delivery rulers) (335). The distinct reports may be delivered to the recipients at the destinations defined in each report template, such as to the recipient's e-mail address, ftp address, and/or business intelligence inbox, for example.

Figure 4:
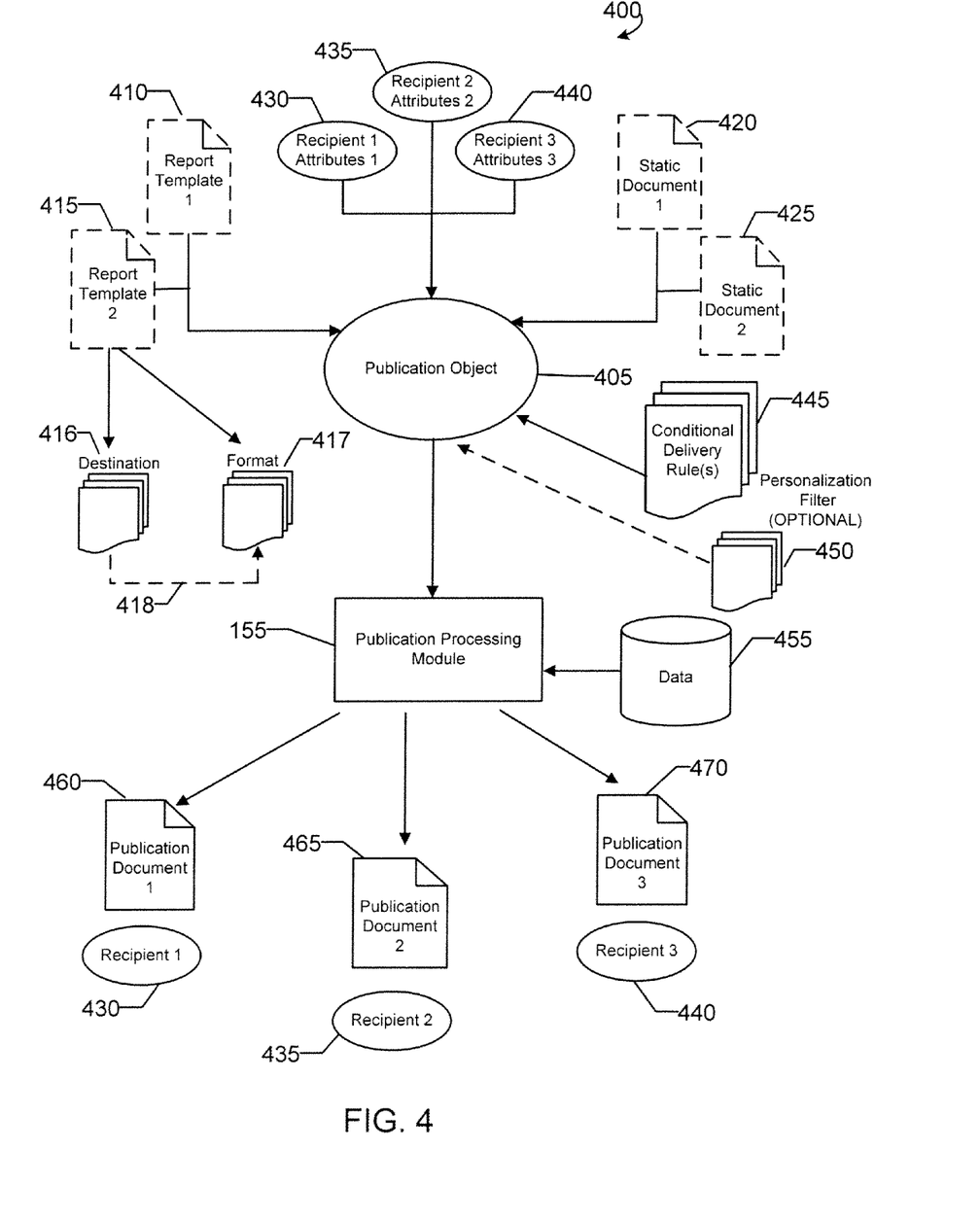
FIG. 4 illustrates an architecture for implementing the operations of FIGS. 2 and 3 according to an embodiment of the invention.

Referring now to FIG. 4, an architecture for implementing the processing operations of FIGS. 2 and 3 according to an embodiment of the invention is described. Publication object 405 is associated with multiple report templates, including report template1 410 and report template2 415. Report template1 410 and report template2 415 have associated formats and destinations. In static documents there can be many formats for each destination. The destinations are recorded in a destination item 416. Each report template links to a destination in the destination item 416. Each report template links to a format in a format item 417. In an embodiment, each destination can specify a format via link 418.

Publication object 405 is also associated with multiple static documents or static document parts, such as static document1 420 and static document2 425. Each static document is associated with a destination in a destination item (not shown), but not a format (unlike a dynamic document). Publication object 405 also includes definitions of multiple recipients for report templates, including recipient1 430, recipient2 435 and recipient3 440, which include recipient attributes1, attributes2 and attributes3, respectively.

Further, publication object 405 also includes definitions of one or more conditional deliver rules 445 for determining conditional delivery of report templates and static documents to each recipient. Publication object 405 may also optionally include definitions of one or more personalization filters 450 for personalizing the generation of reports for each recipient, such as by providing a recipient attribute value for a report parameter.

The processing of publication object 405 to generate distinct publication documents for each recipient is implemented by publication processing module 155. Conditional deliver, rules 445 are evaluated to determine whether report template1 410 and report template2 415 are to be selected for processing. Data may be fetched from one or more data sources 455 and is used to generate distinct reports from report template1 410 and report template2 415, respectively.

Conditional delivery rules 445 are further evaluated to determine conditions for delivery of selected dynamic content from the reports generated from report template1 410 and report template2 415 to each of recipient1 430, recipient2 435 and recipient3 440. The selected dynamic content for each recipient is then merged with one or more static documents, e.g. static document1 420 and static document2 425, as specified by conditional delivery rules 445, to create a distinct publication document for each recipient.

For example, publication document1 460 may be generated according to format1 for delivery to recipient1 430, publication document2 465 may be generated according to format2 for delivery to recipient2 435, and publication document3 470 may be generated according to format3 for delivery to recipient3 440. Finally, according to conditional delivery rules 445, publication document1 460 may be delivered to recipient1 430, publication document2 465 may be delivered to recipient2 435, and publication document3 470 may be delivered to recipient3 440.

Figure 5:
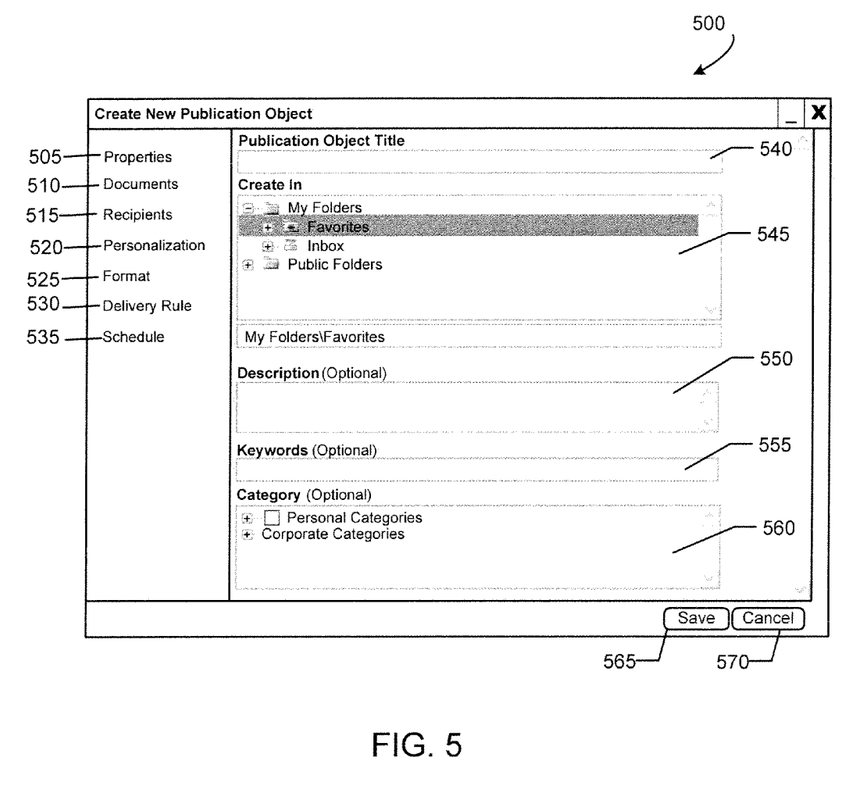
FIG. 5 illustrates an exemplary interface for creating a publication object configured in accordance with an embodiment of the invention.

Referring now to FIG. 5, an example of an interface 500 for creating a publication object configured in accordance with an embodiment of the invention is described. Interface 500, and also interfaces 600, 700, 800, 900, and 1000 in FIGS. 6-10 can be generated by publication definition module 150, optionally in conjunction with GUI module 140, and could be displayed in a window on an output device connected to computer 100 such as a display. Interface 500 includes navigation links 505-535 for accessing specific interface screens associated with aspects of defining a publication object. In this case, interface 500 is associated with Properties Link 505 for creating a new publication object.

Interface 500 includes publication object title box 540 for defining a name for the new publication object, and "Create In" box 545 for defining a location for the publication object to be stored, such as a folder in a directory tree. Interface 500 also includes optional description box 550 for defining a description of the publication object, optional keyword box 555 for defining one or more keywords for association with the publication object and optional category box 560 for associating the publication object with one or more categories. Finally, interface 500 includes save button 565 for storing the publication object at the location defined in "Create In" box 545, and cancel button 570 for canceling the creation of the publication object.

Figure 6:
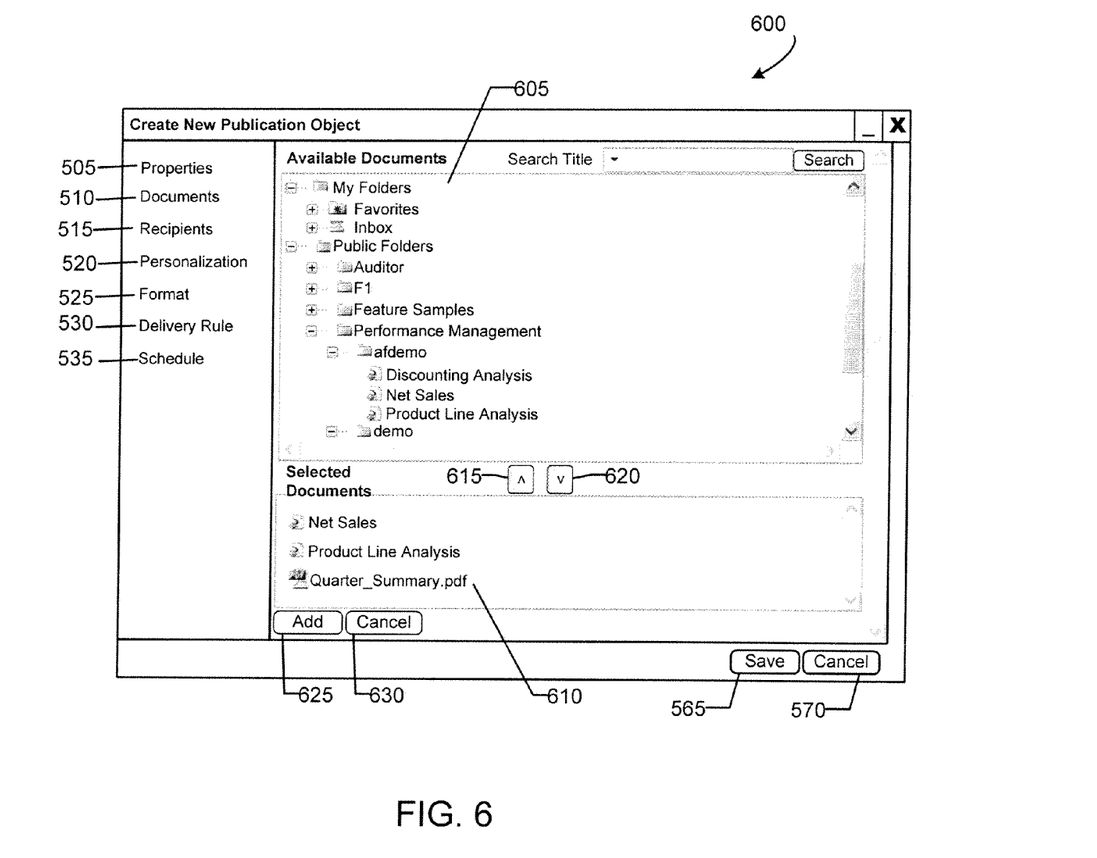
FIG. 6 illustrates an exemplary interface for associating report templates and static documents with a publication object configured in accordance with an embodiment of the invention.

FIG. 6 illustrates an example of an interface 600 for associating report templates and static documents with a publication object configured in accordance with an embodiment of the invention. Interface 600 includes navigation links 505-535 as described above with reference to FIG. 5, and is associated with Documents link 510 for associating report templates with a publication object. Interface 600 includes available documents window 605 for displaying report templates and optionally other documents. e.g., static documents, available for association with the publication object. Interface 600 also allows for navigation of a file directory structure to locate documents.

Selected documents window 610 displays report templates and optionally other documents that have been selected for association with the publication object. For example, selected documents window 610 as shown displays report templates "Net Sales" and "Product Line Analysis" as well as static document "Quarter_Summary.pdf." These report templates and static document can be selected by a user for association with a publication object. It is appreciated that the selected documents can ultimately be processed according to the operations illustrated in FIGS. 2-3 to generate one or more publication documents.

Documents can be moved to selected documents window 610 from available documents window 605 or vice versa using transfer buttons 615 and 620. Add button 625 is for associating selected report templates and optionally other documents displayed in selected documents window 610 with the publication object, and cancel button 630 is for canceling the association of documents.

Figure 7:
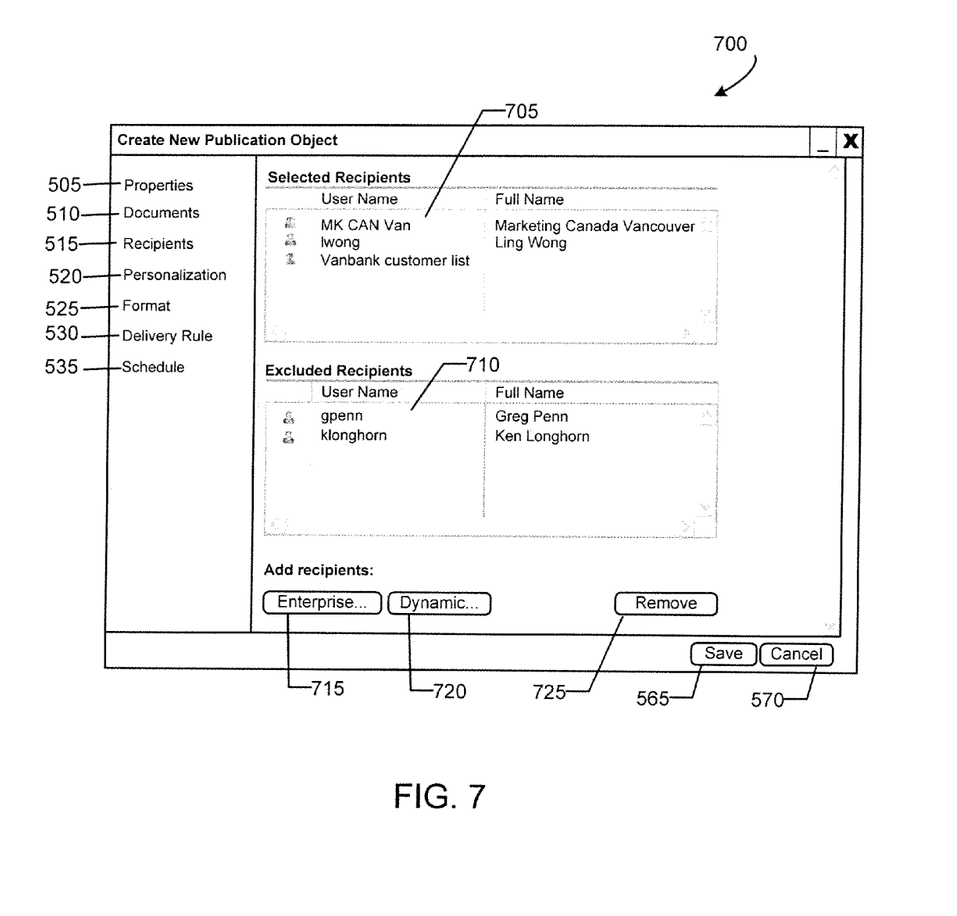
FIG. 7 illustrates an exemplary interface for defining recipients for a publication object created in accordance with an embodiment of the invention.

Referring now to FIG. 7, an exemplary interface for defining recipients for a publication object created in accordance with an embodiment of the invention is described. Interface 700 includes navigation links 505-535 as described above with reference to FIG. 5, and is associated with Recipients link 515 for defining multiple recipients for a publication object. Selected recipients window 705 displays recipients that are to be added to the publication object. Excluded recipients window 710 displays any recipients that are to be excluded from the publication object, such as individual members of a selected recipient group displayed in selected recipients window 705 that are to be excluded from the publication object.

Enterprise recipient button 715 activates an interface (not shown) displaying a list of predefined recipients available for selection as recipients for the publication object and allows selection of available recipients which are then displayed in selected recipients window 705. Dynamic recipient button 720 activates an interface (not shown) allowing definition of dynamically defined recipients for the publication object, such as by attaching a mailing list or database, or by entering recipient attribute information. Following definition of dynamic recipients, they are displayed in selected recipients window 705. Remove button 725 removes selected recipients from selected recipients window 705.

Figure 8:
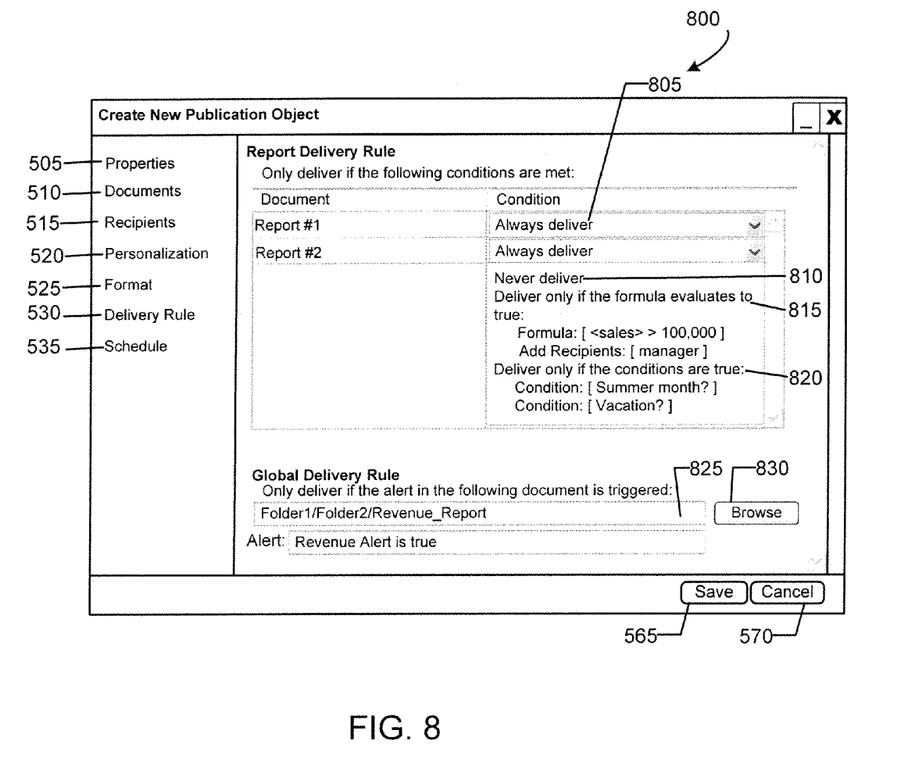
FIG. 8 illustrates an exemplary interface for defining delivery rules in accordance with an embodiment of the invention.

An exemplary interface for defining delivery rules in accordance with an embodiment of the invention is shown in FIG. 8. Interface 800 includes navigation links 505-535 as described above with reference to FIG. 5, and is associated with Delivery Rule link 530 for defining delivery rules for a publication object. Recipient delivery rule window 805 displays reports generated from report templates as described above with reference to FIG. 3 and optionally other documents, e.g., static documents (not shown,) associated with the publication object and allows definition of one or more conditional delivery rules for application to each report or other document.

In one exemplary embodiment, conditional delivery rules may be selected from an all-or-nothing condition (810), logical conditions defined in the report templates (815), and user-defined conditions (820.) All-or-nothing condition 810, for example, indicates whether to always or never deliver Report #2 to the recipients selected as described above with reference to FIG. 7. Logical condition 815, as shown, is a formula that when evaluated to true, signals delivery of selected content from the report to the selected recipients. The selected content in this case corresponds to all the sales data in the report indicating sales above $100,000.

Logical condition 815 also allows for additional recipients to be added to the report if the formula evaluates to true. In this case, for example, Report #2 is to be delivered to the managers of the selected recipients when the sales are above $100,000.

User-defined condition 820 may include one or more conditions specified by the user, for example, conditions that indicate delivery of Report #2 to the selected recipients only during the summer months when the recipients are on vacation. Alternatively, another interface (not shown) may be provided to define custom delivery rules and conditions for application to one or more reports or other documents.

Global delivery rule box 825 may be for adding a global delivery rule condition for use in determining whether reports are to be delivered to the selected recipients based on alerts defined in the report templates. Browse button 830 opens another interface (not shown) allowing navigation of a file directory and selection of global delivery rules from defined logical conditions, such as alerts defined in a report template. In one embodiment, an interface (not shown) may be provided to define custom global delivery rules and conditions.

Figure 9:
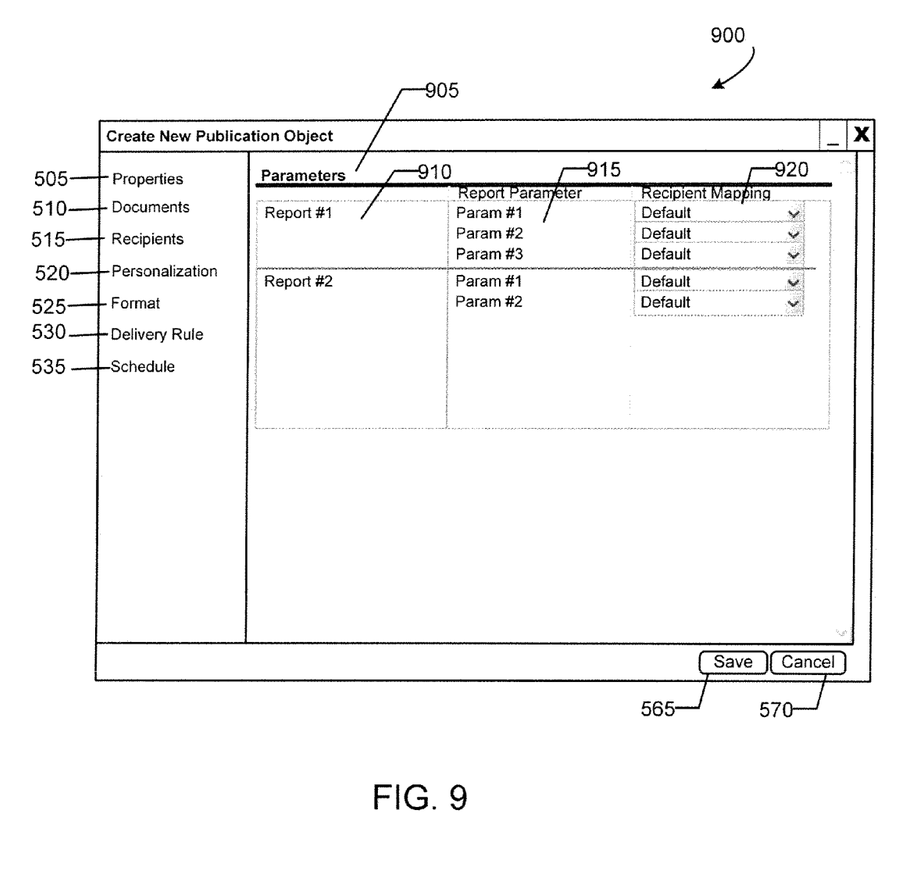
FIG. 9 illustrates an exemplary interface for defining personalization parameters in accordance with an embodiment of the invention.

Referring now to FIG. 9, an example of an optional interface for defining personalization parameters configured in accordance with an embodiment of the invention is described. Interface 900 includes navigation links 505-535 as described above with reference to FIG. 5, and is associated with Personalization link 520 for defining optional personalization filters or parameters for a publication object. Parameters window 905 displays report templates associated with the publication object in column 910, parameters defined in the report templates available for use as personalization filters in column 915 and recipient attributes selected for use as parameter values in column 920. Dropdown boxes in column 920 allow selection of specific recipient attributes, such as name, group or security setting for example to be used as values for each parameter defined in each report template.

Figure 10:
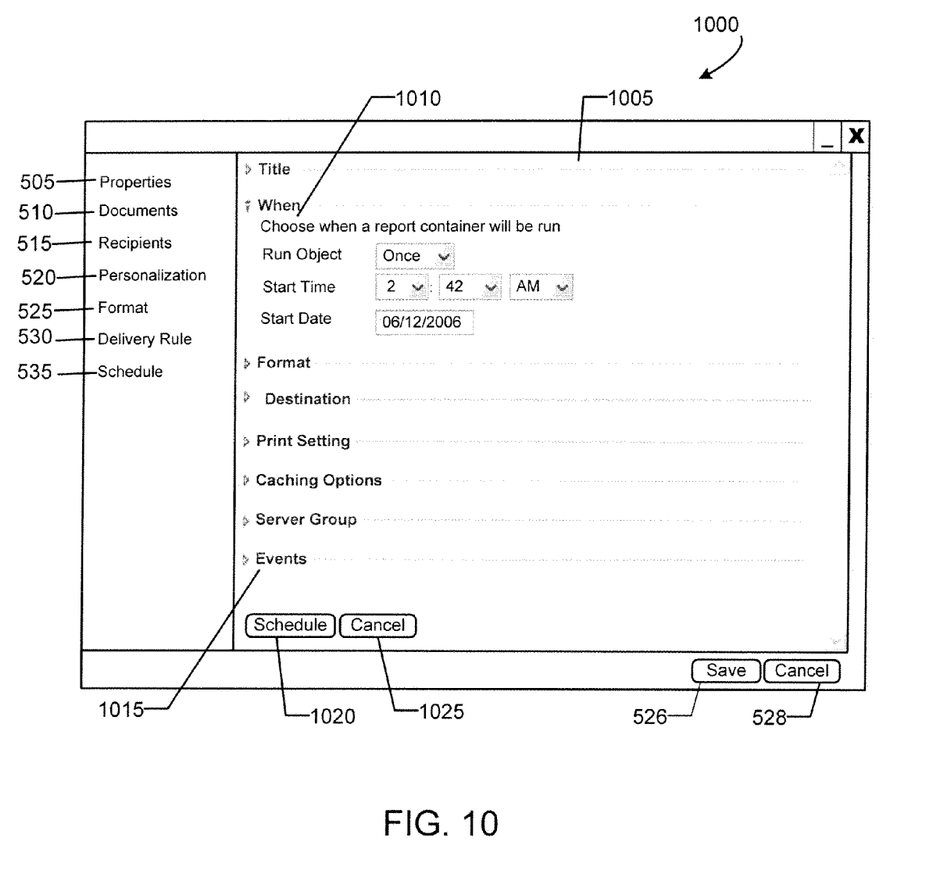
FIG. 10 illustrates an exemplary interface for scheduling processing of a publication object in accordance with an embodiment of the invention.

An exemplary interface for scheduling processing of a publication object in accordance with an embodiment of the invention is shown in FIG. 10. Interface 1000 includes navigation links 505-535 as described above with reference to FIG. 5, and is associated with Schedule link 535 for defining an optional schedule to determine when a publication object is processed. Publication schedule window 1005 displays collapsible settings sections for defining aspects of scheduling the processing of a publication object such as a time-based settings section 1010 and an event based settings section 1015. Time-based settings section 1010 displays options for scheduling either one-time occurrences or regular time intervals for processing the publication object. Schedule button 1020 defines the processing schedule for the publication object according to the settings selected in publication schedule window 1005. Cancel button 1025 is for canceling the definition of a processing schedule.

It is appreciated that when introducing elements of the embodiments of the invention hereinabove the articles "a", "an", "the" and "said" are intended to mean that there are one or more of the elements. Likewise, the terms "comprising," "including" and "having" are intended to be inclusive and to mean that there may be additional elements other than the listed elements.

In one exemplary embodiment, the present invention relates to a computer storage product with a computer-readable medium having computer code thereon for performing various computer-implemented operations for processing queries for combined hierarchical dimensions. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs. DVDs and holographic devices; magneto-optical media; and hardware devices that are specially configured to store and execute program code, such as application-specific integrated circuits ("ASICs"), programmable logic devices ("PIDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another exemplary embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer readable storage medium storing:
   a publication definition module to create and define properties for a publication object, comprising executable instructions to:
      associate a set of static documents and a set of report templates with the publication object;
      define a conditional delivery rule for the publication object, the conditional delivery rule specifying a condition for the inclusion merging of a report template from the set of report templates to be merged with a static document from the set of static documents; and
      define a personalization filter for the publication object, the personalization filter specifying one or more recipient attributes used to personalize a publication document for a corresponding recipient; and
   a publication processing module comprising executable instructions to:
      evaluate the conditional delivery rule and the personalization filter to select one or more report templates from the set of report templates;
      fetch data from a data source for the one or more selected report templates;
      generate distinct reports from the one or more selected report templates;
      evaluate the conditional delivery rule for each distinct report to select dynamic content from each distinct report for each recipient from the set of recipients; and
      merge the dynamic content with each static document associated with the publication object to create a distinct publication document for each recipient from the set of recipients; and
      initiate post processing of at least one of the publication documents, the post processing comprising: digitally signing and/or encrypting the corresponding publication document prior to delivery of the corresponding publication document.

2. The computer readable storage medium of claim 1, wherein the publication definition module further comprises executable instructions to define a set of recipients for the publication object.

3. The computer readable storage medium of claim 1, wherein the conditional delivery rule comprises a set of logical conditions.

4. The computer readable storage medium of claim 3, wherein a logical condition in the set of logical conditions is evaluated with input drawn from data associated with a report generated from the report template.

5. The computer readable storage medium of claim 4, wherein a second logical condition in the set of logical conditions determines whether to deliver a report template to a recipient from a set of recipients.

6. The computer readable storage medium of claim 5, wherein a third logical condition in the set of logical conditions comprises a formula to select dynamic content from each distinct report for each recipient.

7. The computer readable storage medium of claim 5, wherein a fourth logical condition in the set of logical conditions comprises a user-defined condition.

8. The computer readable storage medium of claim 5, wherein a fifth logical condition comprises an additional condition based on an alert defined in a report template.

9. The computer readable storage medium of claim 1, further comprising a graphical user interface module for generating a plurality of user interfaces to create and define the publication object.

10. The computer readable storage medium of claim 1 wherein the publication definition module includes executable instructions to define a format and a destination for each report template associated with the publication object.

11. The computer readable storage medium of claim 10, wherein the format is selected from the list comprising: Crystal Report .rpt, Adobe Acrobat .pdf, Microsoft Word .doc, rich text format .rtf, Microsoft Word editable .rtf, Microsoft Excel .xls, multipurpose Internet mail extension HTML .mhtml, text .txt, tab separated text .ttx, separated values .csv, XML, and compressed archive file formats.

12. The computer readable storage medium of claim 1, wherein the publication processing module includes executable instructions to process the publication object according to a processing schedule.

13. The computer readable storage medium of claim 1, wherein the publication processing module includes executable instructions to deliver distinct publication documents to recipients according to the destinations defined in the report templates.

14. The computer readable storage medium of claim 13, wherein the destinations are selected from the list comprising: e-mail, ftp, business intelligence dashboard, inbox, system folder and repository, and custom destinations.

15. The computer readable storage medium of claim 1, wherein the publication processing module includes executable instructions to determine if post processing is needed for the publication document.

16. The computer readable storage medium of claim 15, wherein post processing is selected from: digitally signing the publication document, encrypting the publication document, aggregating the publication document with another publication document, compressing the publication document, and executing a plugin including computer executable instructions to process the publication document.

17. The computer readable storage medium of claim 15, wherein the executable instructions to determine if post processing is needed for the publication document include executable instructions to check each recipient in a set of recipients defined in the publication object and each destination in a set of destinations for each recipient.

18. A computer-implemented method comprising:
generating a publication object by:
- associating at least one of a plurality of dynamic documents with the publication object, the dynamic documents comprising report templates;
- associating at least one of a plurality of static documents with the publication object;
- defining at least one of a plurality of recipients and their associated attributes for the publication object;
- defining at least one of a plurality of formats and at least one of a plurality of destinations for the publication object;
- defining at least one of a plurality of conditional delivery rules;
- defining at least one personalization filter for at least one of the plurality of recipients, the at least one personalization filter specifying one or more recipient attributes used to personalize a publication document for a corresponding recipient; and
- defining a processing schedule for the publication object;

generating a plurality of publication documents as defined in the publication object;
digitally signing and/or encrypting at least one of the plurality of publication documents for delivering when determining that a post processing is required for at least one recipient defined in the publication object; and
delivering the plurality of publication documents according to the publication object.

19. A computer-implemented method comprising:
selecting a publication object for processing;
evaluating, based on the selected publication object, at least one of a plurality of conditional delivery rules to select at least one of a plurality of report templates and to select at least one of a plurality of static documents;
fetching data from a data source to populate the at least one of a plurality of report templates;
generating distinct reports from at least one of a plurality of formats and at least one of a plurality of destinations;
evaluating at least one of the plurality of conditional delivery rules to select dynamic content for each recipient;
determining that post processing is required for each recipient, the post-processing comprising one or more actions selected from a group comprising: digitally signing a publication document, encrypting a publication document, aggregating a collection of publications, aggregating and compressing a collection of publications, and executing a plugin with computer executable instructions;
merging, based on the determination that post-processing is required, the selected dynamic content with the selected static documents to create distinct publication documents requiring post-processing for each recipient;
performing the required post-processing; and
delivering distinct publication documents to each of the recipients.

* * * * *